United States Patent [19]

Rodriguez

[11] Patent Number: 4,909,274
[45] Date of Patent: Mar. 20, 1990

[54] VALVE APPARATUS

[76] Inventor: Osmani A. Rodriguez, 6 Wyman St., Jamaica Plain, Mass. 02130

[21] Appl. No.: 370,831

[22] Filed: Jun. 23, 1989

Related U.S. Application Data

[63] Continuation-in-part of Ser. No. 216,228, Jul. 7, 1988.

[51] Int. Cl.⁴ .................. F16K 33/00; F16K 31/24; F24H 9/20
[52] U.S. Cl. .................. 137/312; 122/13 R; 122/504; 126/359; 137/429; 137/446; 200/84 R; 222/108; 417/40
[58] Field of Search ............. 122/13 R, 504; 126/359; 137/312, 429, 430, 446, 565; 200/61.04, 84 R; 222/108; 417/36, 40; 340/604, 605, 616

[56] References Cited

U.S. PATENT DOCUMENTS

| | | | |
|---|---|---|---|
| 1,074,327 | 9/1913 | Johnson | 137/429 |
| 1,628,404 | 5/1927 | Heuermann | 137/446 |
| 2,358,591 | 9/1944 | Pugatz | 137/429 |
| 2,431,640 | 11/1947 | Gordon | 137/446 |
| 2,724,401 | 11/1955 | Page | 137/312 |
| 2,739,662 | 3/1956 | Sofia | 417/40 |
| 3,063,432 | 11/1962 | Bond et al. | 122/504 |
| 3,069,671 | 12/1962 | Taylor | 137/312 |
| 3,473,553 | 10/1969 | Collins | 137/312 |
| 3,605,799 | 9/1971 | Cherne | 137/429 |

*Primary Examiner*—George L. Walton
*Attorney, Agent, or Firm*—Paul G. Lunn

[57] ABSTRACT

Disclosed is a valve apparatus having water inlet and outlet pipes, means for maintaining water which may have ruptured from a water storage tank in a water containment area, a float within the water containment area, a float-rod attached to the float which has a triangular gear attached to the other end of the float-rod. The triangular gear interacts with a circular gear when the float-rod is raised causing the circular gear to rotate away from the valve housing pulling a rod which causes a metal strip to be pulled over the water outlet pipe preventing water from being delivered from the valve housing to the ruptured water storage tank. The on/off switch of a water pump may also be connected to the float-rod such that the water pump is turned on when the float-rod is turned on pumping water out of the water containment area.

2 Claims, 3 Drawing Sheets

VALVE APPARATUS

The present application is a continuation-in-part of Serial No. 216,228 filed on July 7, 1988 pending.

FIELD OF THE INVENTION

The present invention is in the field of valves used to shut off the flow of a liquid through a conduit.

BACKGROUND OF THE INVENTION

Tanks which hold water such as hot water heaters contain a tremendous amount of water. If a tank were to burst, a large amount of water damage could occur.

SUMMARY OF THE INVENTION

The present invention is a valve apparatus for shutting off water going into a water storage tank when the tank has ruptured. The valve apparatus is comprised of a valve housing into which a water inlet pipe empties water. A water outlet pipe is connected to the valve housing which delivers water from the valve housing to a water storage tank. An outlet hole cover is attached to a valve rod within and extending through the valve housing. The valve rod is movable such that when the rod is pulled the outlet hole cover is pulled over the outlet pipe opening such that water cannot flow from the valve housing into the outlet pipe and into a ruptured tank.

A means is provided for maintaining water which may leak from ruptured tank in a water containment space. A float is contained within the water containment space. One end of a float-rod is attached to and extends vertically up from the float. A gear mechanism is attached to the other end of the float-rod distal from the end attached to the float. The triangular gear has one side having a side containing teeth. A gear guide having an elongated slot is attached to the exterior of the valve housing. A circular gear having teeth about its circumference is mounted on the gear guide and to the valve rod which extends out of the valve housing such that when that the gear rotates away from the valve housing within the elongated slot of the gear guide, the valve rod out is pulled out of the valve housing.

The triangular gear is positioned within the elongated slot of the gear guide between the valve housing and the circular gear such that the teeth along the toothed side of the triangle interlock with the teeth on the circular gear. As the float rises due to water entering the water containment area from a ruptured water storage tank, the float-rod is raised causing the triangular gear to rotate the circular gear away from the valve housing pulling the valve rod out of the valve housing. The valve rod then pulls the outlet hole cover over the outlet hole of the outlet pipe preventing water from being delivered from the valve into the outlet pipe and into the water storage tank.

Optionally, a water pump is placed in the water containment space. The on/off switch of the water pump is connected to the float-rod such that the water pump is turned on when the water from a ruptured tank fills the water containment area and the float and float-rod rise up.

DETAILED DESCRIPTION OF THE INVENTION

Figure 1:
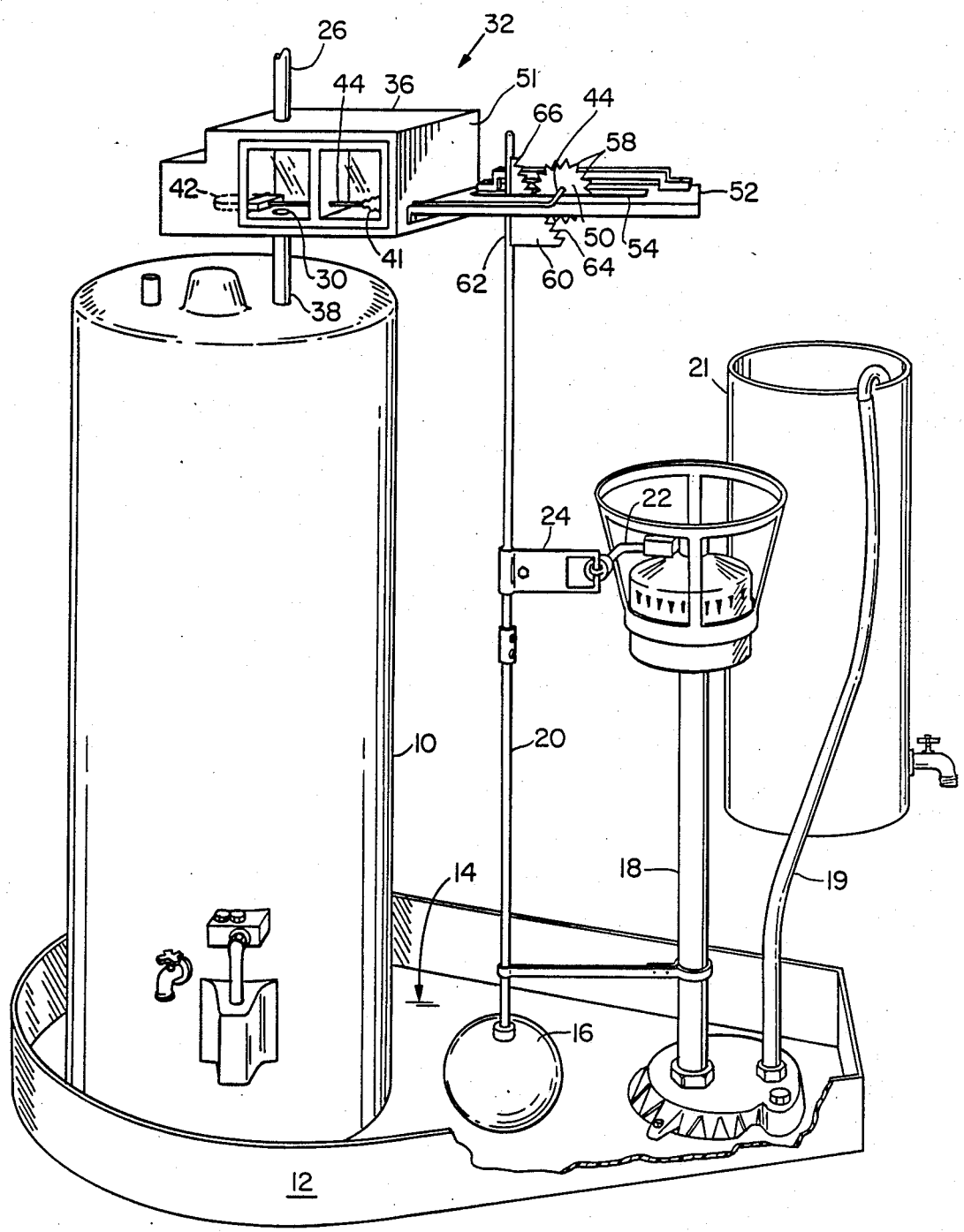
FIG. 1 shows a perspective view of the valve apparatus of the present invention.
Figure 2:
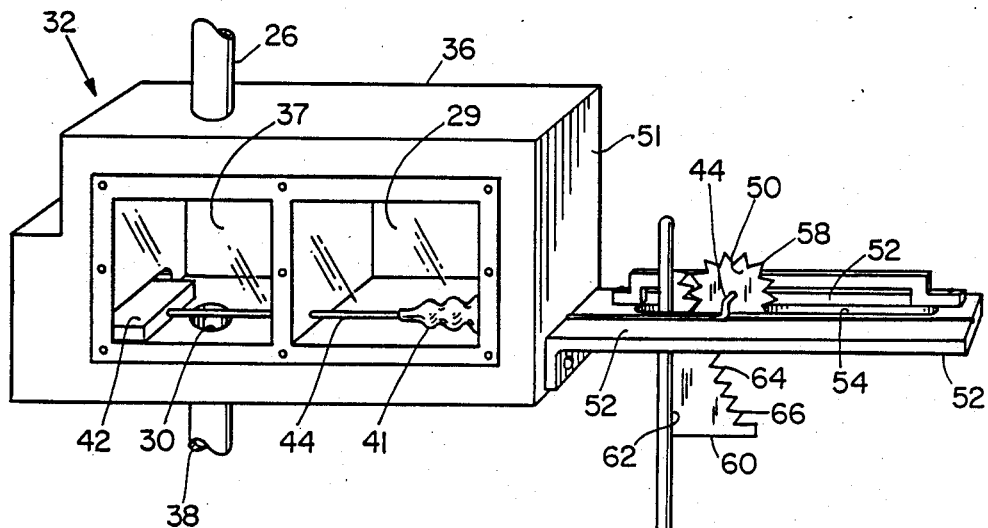
FIG. 2 shows a perspective view of the present invention without the hot water heater.
Figure 2:
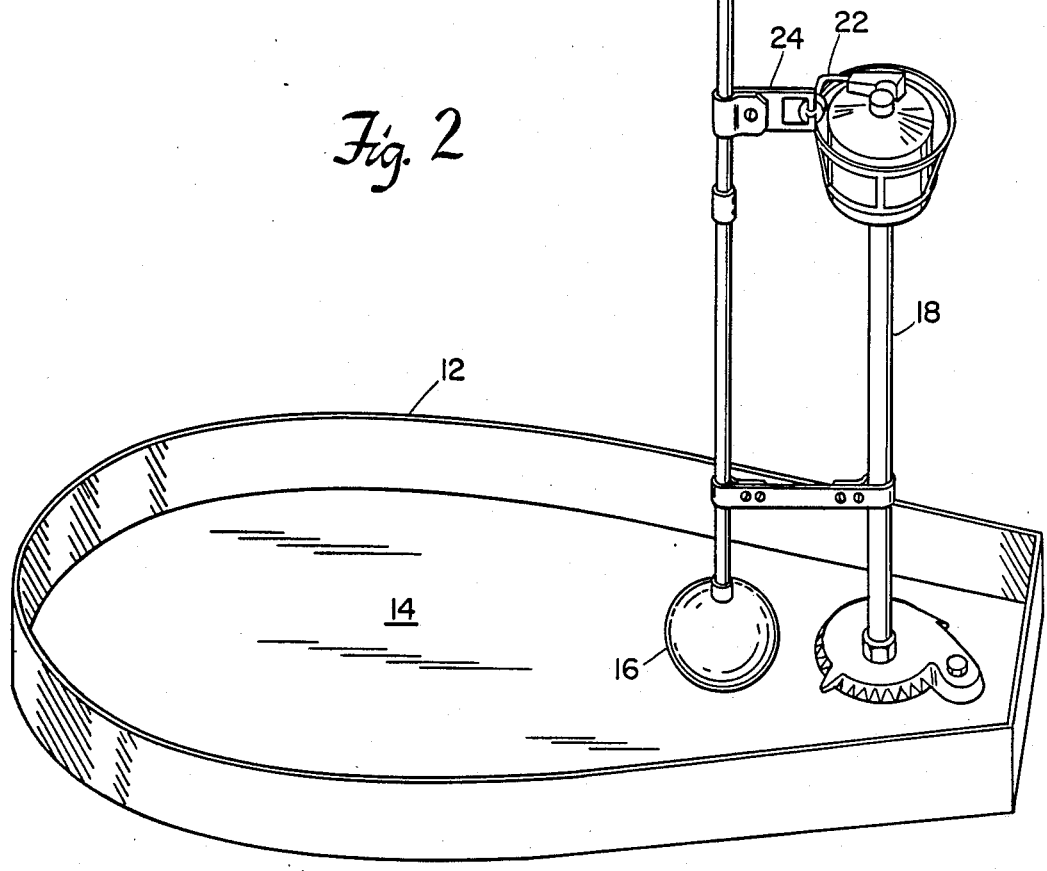
Figure 3:
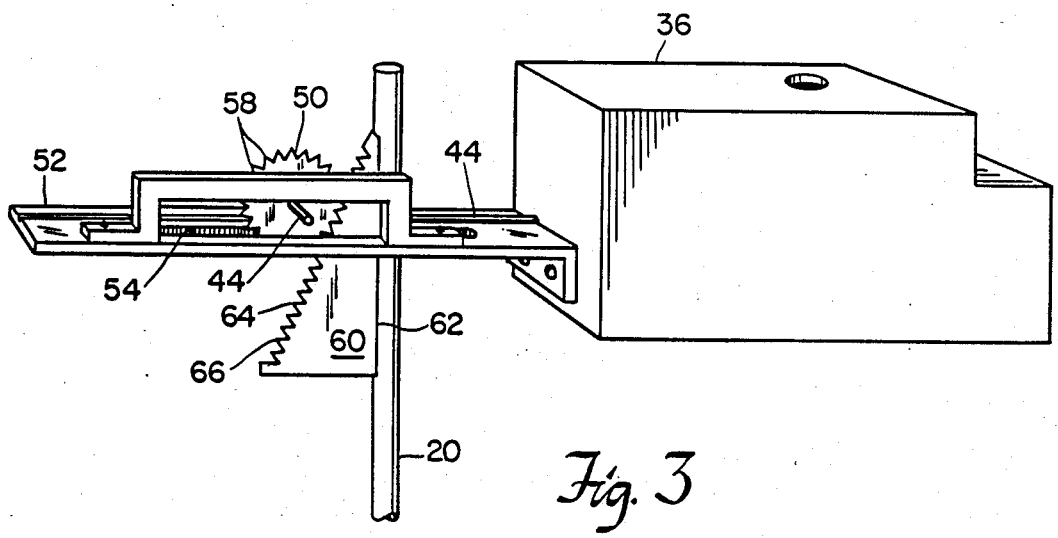
FIG. 3 shows a perspective view of the gear mechanism of the valve apparatus of the present invention.

A preferred embodiment of the Valve Apparatus system of the present invention is shown in FIGS. 1, 2 and 3. A hot water heater 10 is surrounded by plastic fencing 12 which entraps water in a confined space 14 which may leak from tank 11 of hot water heater 10. Within confined space 14 is a float 16 and a water pump 18 (a preferred water pump is manufactured by Marathon Electric, Wausau, Wisconsin having a model No. PQD48517039 (F.P.). Extending vertically from float 16 is a float-rod 20. Extending from the top of water pump 18 is an on/off switch 22 which connects to a metal strip 24. Metal strip 24 is also connected to rod 20 such that when rod 20 is lifted up switch 22 is engaged turning water pump 18 on. Pump 18 pumps water from confined area 14 through a hose 19 into a water storage tank 21. When the water has been pumped out of the water containment area, float 16 and rod 20 will lower causing switch 22 to turn to the off position causing pump 18 to cease operating.

Water is delivered into the tank 11 of hot water heater 10 by mean of inlet pipe 26 which extends into valve housing 36 of valve 32 and pipe 38 extends from housing 36 into the tank 11 of hot water heater 10. Housing 36 is made of aluminum.

Valve 32 is designed to close when the tank of hot water heater 10 bursts so as to prevent additional water from flowing into the tank when it is ruptured. The flow of water from housing 36 to pipe 38 is stopped by means of a copper metal strip 42 when metal strip 42 is pulled over an inlet hole 30 of pipe 38 which is surrounded by a washer (not shown) within housing 36. Metal strip 42 is attached to an aluminum rod 44. Rod 44 extends through a bellow washer 41 and through a hole in wall 51 of housing 36 and attaches to a wheel gear 50 which is located on and rotates along a guide 52 which is attached and is adjacent to the exterior of wall 51. Within the hole in wall 51 is a cylinder having a narrow hole (not shown); rod 44 extends through the hole within the cylinder as the rod proceeds through wall 51. The cylinder within wall 51 extends slightly within housing 36 and the large end of bellow washer 41 surrounds the cylinder within housing 36. As rod 44 is pulled through the cylinder, bellow washer 41 seals the hole so no water leaks from housing 36. When wheel gear 50 is rolled away from wall 51 along guide 52 rod 44 is pulled from housing 36 pulling metal strip 42 over water inlet hole 30 of pipe 38 preventing water from flowing from housing 36 into to the tank 11 of hot water heater 10.

Guide 52 has an elongated hole 54 along which gear 50 rotates. About the circumference of gear 50 are teeth 58. Extending through hole 54 and located between wall 48 and gear 50 is triangular gear 60. Triangular 60 is shaped to form a right triangle having a leg 62 attached to the end of rod 20 opposite the end attached to float 16. Hypotenuse 64 of gear 60 has teeth 66 which meshes with teeth 58 of gear 50. The smallest angle of gear 60 is at the upper end of rod 20 such that hypotenuse 64 extends down and away from rod 20. When gear 60 is raised up the interaction of of teeth 66 of hypotenuse 64 with teeth 58 of gear 50 causes gear 50 to rotate away from housing 38 pulling rod 44 out which pulls metal strip 42 over water inlet hole 30. Ideally the gear mechanism should be enclosed by a plastic or aluminum cover.

Figure 4:
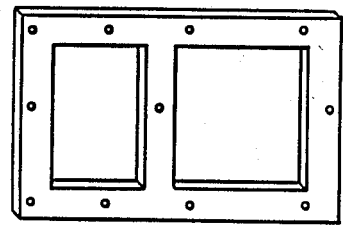
FIG. 4 shows a perspective view of a gasket used to seal the viewing ports of the Present Invention.

Housing 36 has two viewing ports 37 and 29. Over the viewing ports is placed a rubber gasket 43, shown in FIG. 4, using *Plumber's Good Superior Adhesive and Sealant* (manufactured by Electric Products Inc. Carson, CA 90745) or any other similar adhesive. A clear plastic window is then bolted onto the rubber gasket 43.

To summarize, inlet pipe 26 delivers water to housing 36. When metal strip 42 is not covering inlet hole 30 water flows through housing 36 through pipe 38 and into the tank 11 of the hot water heater 10. If the tank of the hot water heater 10 were to burst, confined area 14 would fill with water raising float 16 which would in turn raise rod 20. When rod 20 is raised triangular gear 60 is raised. Teeth 66 of gear 60 intermesh with teeth 58 and push teeth 58 up causing gear 50 to rotate away from wall 48 pulling rod 44 out pulling metal strip 42 over inlet hole 30 preventing water from flowing through pipe 38 and into the ruptured tank 11 of hot water heater 10. Also, as rod 20 is lifted so metal strip 24 which causes switch 22 of water pump 18 to be turned on. Water pump 18 then pumps water from contained area 14 and into a water storage tank 19. When the water has been pumped out of the water containment area, float 16 and rod 20 will lower causing switch 22 to turn to the off position causing pump 18 to cease operating. When metal strip 42 has been pulled over hole 30, it will remain in that position presenting water from entering into tank 11 through pipe 38 even though rod 20 and triangular gear 60 are lowered due to the fact that pump 18 has pumped the water out of water containment area 14. However, as additional water leaks from tank 11, float 16 and rod 20 will again be raised turning switch 22 to the on position causing pump 18 to start pumping water out of containment area 14 and into tank 19 again. This operation will continue until all of the water has drained from the ruptured tank of the hot water heater.

EQUIVALENTS

Those skilled in the art will recognize, or be able to ascertain using no more than routine experimentation, many equivalents to the specific embodiments of the invention described herein. Such equivalents are intended to be encompassed by the following claims.

INDUSTRIAL APPLICABILITY

The present invention can be used in the manufacture of a hot water heater.

I claim:

1. A valve apparatus comprised of:
(a) a water inlet pipe attached to a water source;
(b) a valve housing, said water inlet pipe entering and delivering water into the valve housing;
(c) a water outlet pipe, said water outlet pipe being connected to the valve housing so to be able to deliver water from the valve housing to a water storage tank, said water outlet pipe having an outlet opening, said outlet opening receiving water from the valve housing;
(d) an outlet hole cover attached to a rod within and extending through the valve housing, said rod being movable such that when the rod is pulled the outlet hole cover is pulled over the outlet pipe opening such that water cannot flow from the valve housing into the outlet pipe;
(e) means for maintaining water which may leak from the water storage tank in a water confinement space, said water storage tank being received and supported within said water confinement space;
(f) a float contained within the water confinement space;
(g) a float rod one end of which is attached to and extending vertically up from the float;
(h) a triangular gear attached to the end of the float-rod distal from the end attached to the float rod, said triangular gear having one side having a side containing teeth;
(i) a gear guide attached to the valve housing, said gear guide having an elongated slot;
(j) a circular gear having teeth about its circumference, circular gear being mounted on the gear guide such that the gear rotates within the elongated slot of the gear guide, the valve rod extending out of the valve housing and attaching to the circular gear, and the triangular gear being positioned within the elongated slot of the gear guide between the valve housing and the circular gear such that the teeth along the toothed side of the triangle interlock with the teeth of the circular gear such that as the float is being raised due to water entering the water confinement space from a ruptured water storage tank the float-rod is raised causing the triangular gear to be raised and moved up through the elongated slot resulting in the circular gear rotating along and within the elongated slot away from the valve housing pulling the valve rod out of the valve housing such that the valve rod pulls the outlet hole cover over the outlet hole of the outlet pipe preventing water from being delivered from the valve into the outlet pipe and into the water storage tank, such that when said water in the water confinement space is lowered the float and float rod are lowered causing the triangular gear to be lowered through the elongated slot thus rotating the circular gear along and within the elongated slot toward the valve housing for moving the outlet hole cover away from the outlet hole permitting water into the inlet pipe and into the storage tank.

2. A valve apparatus as recited in claim 1, further comprising:
a water pump, said water pump having on on/off switch, said on/off switch being attached to the float-rod such that as the float-rod is raised the water pump is switched on pumping water from the water containment area.

* * * * *